United States Patent
Chen

(10) Patent No.: US 11,005,529 B2
(45) Date of Patent: May 11, 2021

(54) FUSELESS SWITCH FOR CROSS PHASE OF POWER LINE COMMUNICATION

(71) Applicant: Yen-Po Chen, Taipei (TW)

(72) Inventor: Yen-Po Chen, Taipei (TW)

( * ) Notice: Subject to any disclaimer, the term of this patent is extended or adjusted under 35 U.S.C. 154(b) by 0 days.

(21) Appl. No.: 16/625,945

(22) PCT Filed: Jun. 29, 2017

(86) PCT No.: PCT/CN2017/000413
§ 371 (c)(1),
(2) Date: Dec. 23, 2019

(87) PCT Pub. No.: WO2019/000114
PCT Pub. Date: Jan. 3, 2019

(65) Prior Publication Data
US 2020/0169292 A1    May 28, 2020

(51) Int. Cl.
*H04B 3/54* (2006.01)
*H01H 83/12* (2006.01)
*H01H 83/16* (2006.01)
*H01H 83/18* (2006.01)

(52) U.S. Cl.
CPC ............... *H04B 3/54* (2013.01); *H01H 83/12* (2013.01); *H01H 83/16* (2013.01); *H01H 83/18* (2013.01)

(58) Field of Classification Search
None
See application file for complete search history.

(56) References Cited

U.S. PATENT DOCUMENTS

| 2011/0163837 A1* | 7/2011 | Darr | H01H 71/123 337/186 |
| 2020/0185172 A1* | 6/2020 | Chen | H01H 35/14 |

FOREIGN PATENT DOCUMENTS

| CN | 101923993 | 12/2010 |
| CN | 202102997 | 1/2012 |
| CN | 205453297 | 8/2016 |
| JP | 2001038305 | 2/2001 |
| TW | 312001 | 8/1997 |
| TW | 201526565 | 7/2015 |

OTHER PUBLICATIONS

JP1999219653—Machine Translation from WIPO (Year: 1999).*
English Translation of International Preliminary Report on Patentability Chapter I (Year: 2019).*

* cited by examiner

*Primary Examiner* — Carlos Garcia
(74) *Attorney, Agent, or Firm* — Schmeiser, Olsen & Watts LLP

(57) ABSTRACT

A fuseless switch for a cross phase of a power line communication (PLC) network includes a movable contactor, a switch, an electromagnetic tripper, a base and a microcontroller. The microcontroller further includes a low-voltage coupler electrically connected to a first ground line of the first circuit connection terminal and a second ground line of the second circuit connection terminal, so that a network connection signal can cross phases to complete the transmission of information. When a PLC network signal passes through the fuseless switch, the signal proceeds from the low-voltage coupler without being affected or attenuated by the original fuseless switch circuit, so as to overcome the issue of transmitting signals through the power line to other circuits.

5 Claims, 3 Drawing Sheets

US 11,005,529 B2

FUSELESS SWITCH FOR CROSS PHASE OF POWER LINE COMMUNICATION

FIELD OF INVENTION

The present invention relates to the field of signal transmissions, in particular to the signal transmission of a power line communication (PLC) network capable of overcoming the issue of a conventional signal transmission in which the signal transmitted through a fuseless switch is attenuated significantly.

BACKGROUND OF INVENTION

Description of the Related Art

Power line communication (PLC) network uses a power line for transmitting a current as a communication carrier, and the network can be connected as long as there is a power socket provided in a place such as a room. When a signal is transmitted through the PLC, user data are modulated by a GMSK or OFDM technology, and alternate current is used as the carrier for transmitting data, and a receiver end uses a transformer coil to couple the AC signal and step down the voltage, and a filter is provided for filtering the modulated signal from the carrier in order to obtain the original communication signal.

However, the present PLC is just applied to single-circuit power lines only. Regardless of home or company, the layout of the power line is arranged into separate circuits according to actual requirements, since data cannot cross the circuit directly for the transmission. In the prior art, the signal is attenuated greatly by 100 to 1000 times once it crosses the circuit. If a device with a relatively large noise is used in the circuit, then the network communication signal cannot be completely distributed to a specified space, and the function of transmitting network signals through the power line will be lost.

SUMMARY OF THE INVENTION

In view of the aforementioned drawbacks of the prior art, the present invention discloses a fuseless switch capable of significantly reducing the occurrence of signal attenuation when a signal passes through a fuseless switch, so that the PLC signal can cross phases to achieve the signal transmission effect.

To achieve the aforementioned and other objectives, the present invention provides a fuseless switch for a cross phase of a power line communication network comprising a movable contactor, a switch, an electromagnetic tripper, a base and a microcontroller. The microcontroller further comprises a low-voltage coupler electrically coupled to a first ground line of the first circuit connection terminal and a second ground line of the second circuit connection terminal, so that the network connection signal can cross phases to complete the transmission of information.

In addition, the movable contactor is linearly coupled between a first circuit connection terminal and a second circuit connection terminal and cooperated with the switch. The switch is coupled to the movable contactor through a mechanism. The electromagnetic tripper is coupled to the movable contactor and capable of driving the movable contactor to leave its original position in order to disconnect the first circuit connection terminal from the second circuit connection terminal. The base is electrically coupled to the electromagnetic tripper, and the microcontroller is electrically coupled to the base and comprises a low-voltage coupler electrically coupled to a first ground line of the first circuit connection terminal and a second ground line of the second circuit connection terminal.

When a PLC network signal passes through the fuseless switch of the present invention, the signal will proceed from the low-voltage coupler, so that the signal will not be affected or attenuated by the original fuseless switch circuit, and the present invention can overcome the issue of transmitting signals through the power line to other circuits.

Further, the low-voltage coupler is electrically coupled to a first neutral line of the first circuit connection terminal and a second neutral line of the second circuit connection terminal to increase the number of paths for transmitting the signals to other circuits.

Further, the microcontroller is coupled to a vibration detection module and a signal transmission module via signals. The vibration detection module is provided for detecting whether or not a vibration occurs and the signal transmission module is provided for transmitting information or receiving an instruction.

Further, the microcontroller further comprises a status detection module for detecting voltage information, current information or temperature information between the first circuit connection terminal and the second circuit connection terminal. In addition, the status detection module is coupled to the signal transmission module via signals to complete monitoring a status and allow users to receive information instantly from a remote end and know the status immediately.

Wherein, the coupler is preferably an inductive low-voltage coupler or a capacitive low-voltage coupler.

A preferred embodiment of the present invention will be disclosed in the following description. The constitution of the present invention and the effect achieved by the present invention will be described in detail with reference to related numerals and drawings below.

BRIEF DESCRIPTION OF NUMERALS USED IN THE FIGURES

1—Fuseless switch; 11—Movable contactor; 111—First circuit connection terminal; 112—Second circuit connection terminal; 1111—First ground line; 1121—Second ground line; 12—Switch; 13—Electromagnetic tripper; 14—Base; 15—Microcontroller; 151—Low—voltage coupler; 152—Low—voltage coupler; 153—Vibration detection module; 154—Signal transmission module; 155—State detection module.

DESCRIPTION OF THE PREFERRED EMBODIMENTS

Figure 1:
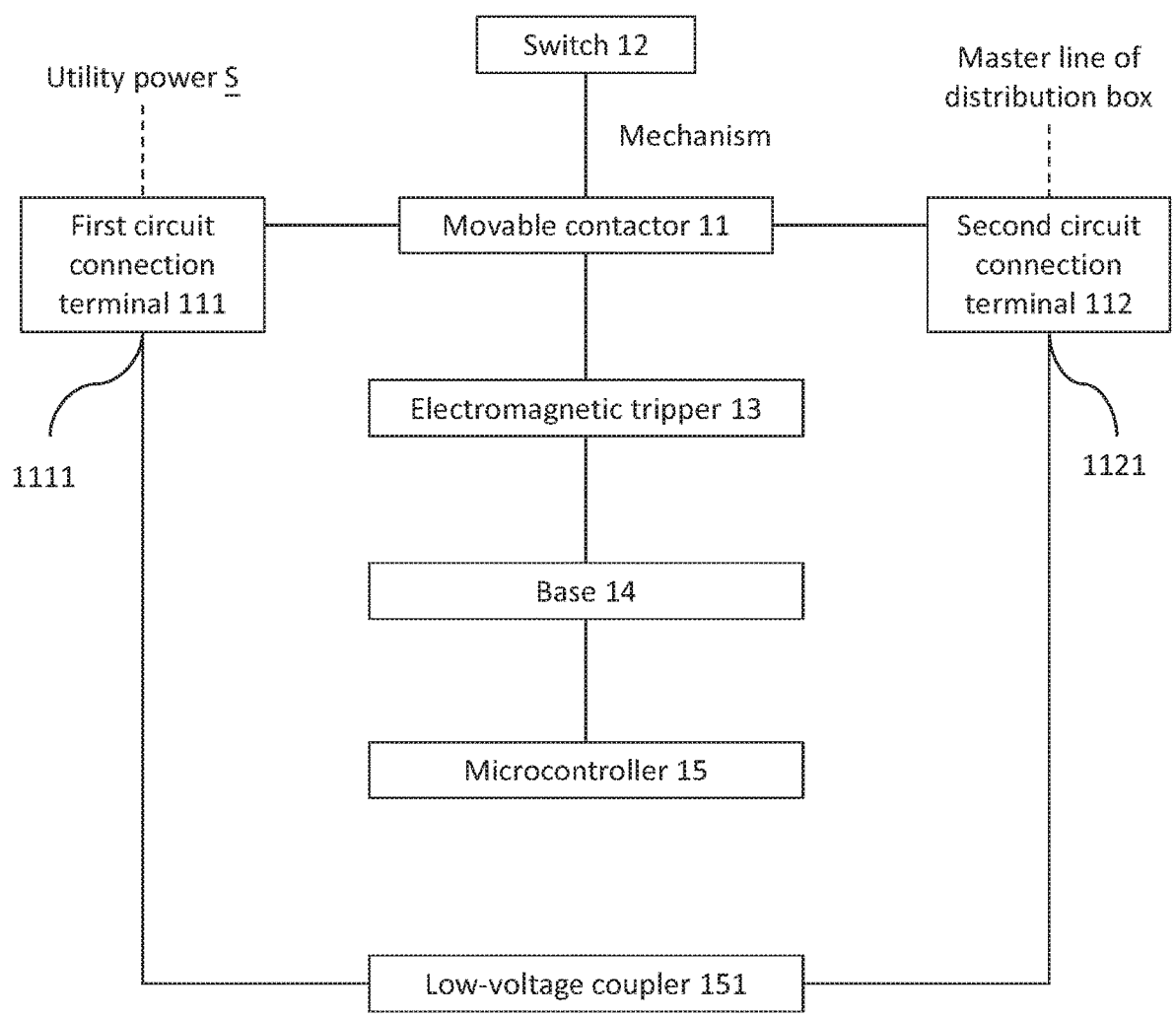
FIG. 1 is a schematic block diagram of a fuseless switch in accordance with a first embodiment of the present invention.
Figure 2:
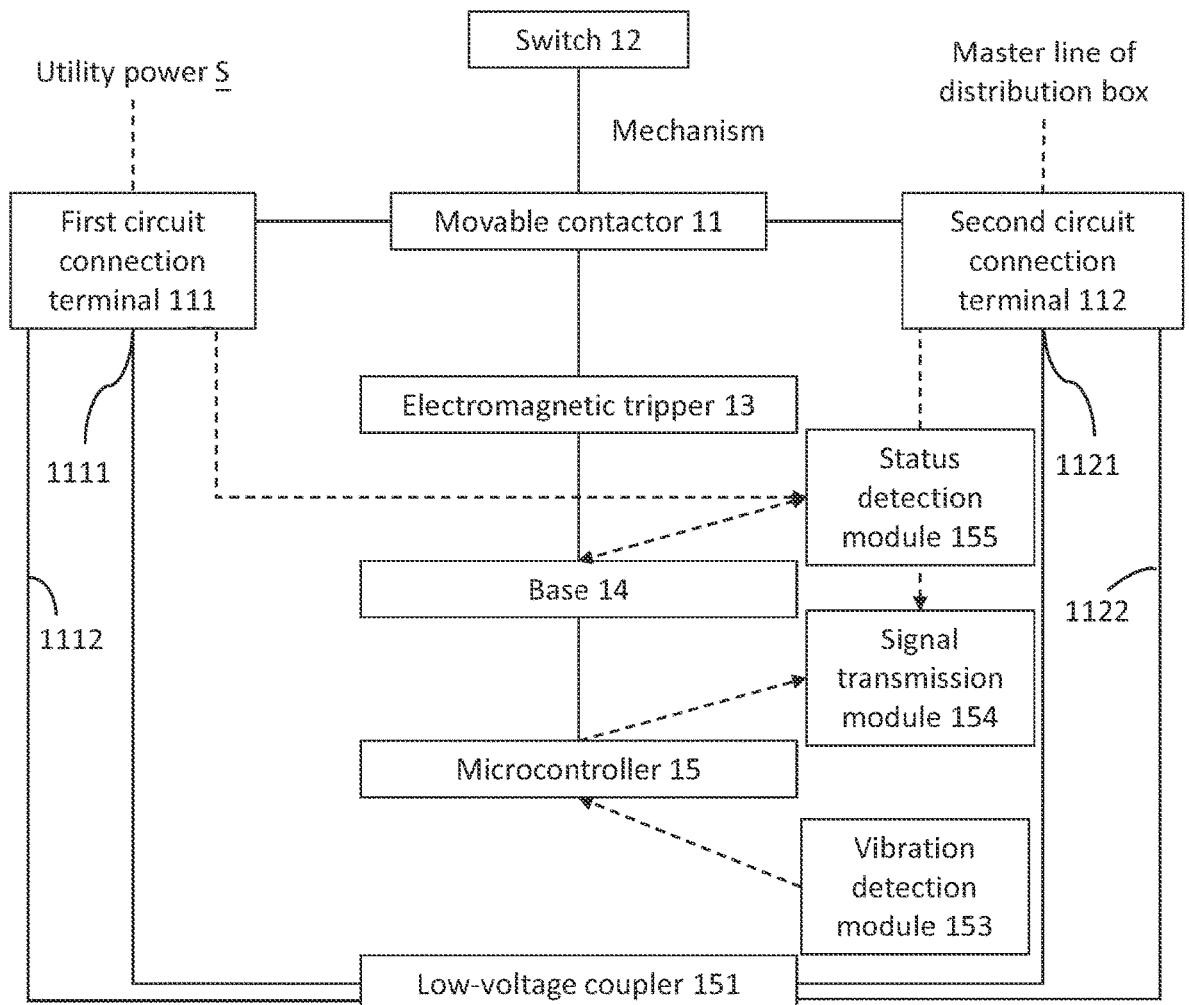
FIG. 2 is a schematic block diagram of a fuseless switch in accordance with a second embodiment of the present invention.

With reference to FIG. 1 for a fuseless switch 1 in accordance with the first embodiment of the present invention, the fuseless switch 1 is provided for preventing the occurrence of a large attenuation of signals at a fuseless switch, when the signals of a power line communication (PLC) network are transmitted through a power line, so that the signals can cross phases. In other words, the PLC signals can be transmitted through the power line to other power lines in the same area.

To achieve the aforementioned and other objectives, the present invention provides a fuseless switch for a cross phase of a power line communication network 1, and the fuseless switch comprises a movable contactor 11, a switch 12, an electromagnetic tripper 13, a base 14, and a microcontroller 15.

The movable contactor 11 is movably and electrically coupled between a first circuit connection terminal 111 and a second circuit connection terminal 112. When the movable contactor 11 touches the first circuit connection terminal 111 and the second circuit connection terminal 112 at the same time, the first circuit connection terminal 111 and the second circuit connection terminal 112 are electrically coupled to each other to define an electrical conduction. On the other hand, when the movable contactor 11 does not touch the first circuit connection terminal 111 or the second circuit connection terminal 112, an open circuit will be formed, and electric power will not be imported. Wherein, the first circuit connection terminal 111 is an electric cable for connecting utility power, and the second circuit connection terminal 112 is a circuit designated for connecting indoor circuits in order to import electric power for the use by indoors circuits.

The switch 12 is coupled to the movable contactor 11 through a mechanism for controlling the position of the movable contactor 11 relative to the first circuit connection terminal 111 and the second circuit connection terminal 112. The electromagnetic tripper 13 is coupled to the movable contactor 11 and capable of driving the movable contactor 11 to move, so as to control the electrical connection and disconnection between the first circuit connection terminal 111 and the second circuit connection terminal 112. Since the switch 12 is coupled by the mechanism, therefore when the electromagnetic tripper 13 changes the position of the movable contactor 11, the switch 12 will return to its original position accordingly.

The base 14 and the electromagnetic tripper 13 are electrically coupled to each other. The microcontroller 15 is electrically coupled to the base 14 and comprises a low-voltage coupler 151 electrically coupled to a first ground line 1111 of the first circuit connection terminal and a second ground line 1121 of the second circuit connection terminal.

With the installation of the low-voltage coupler 151, the first ground line 1111, and the second ground line 1121, the network signal carried by the power line and passing through the low-voltage coupler will not be attenuated significantly under the condition of not affecting the flow of electric power, so that the network signal can be connected to devices in a same room. Wherein, the coupler is an inductive low-voltage coupler or a capacitive low-voltage coupler.

The microcontroller 15 further comprises another low-voltage coupler 152 electrically coupled to a first neutral line 1112 of the first circuit connection terminal 111 and a second neutral line 1122 of the second circuit connection terminal 112, so that the network signal is connected to other circuits and can be applied to a single-phase two-wire mode.

Further, the microcontroller 15 is coupled to a vibration detection module 153 and a signal transmission module 154 via signals. The vibration detection module 153 is provided for detecting whether or not a vibration occurs. If the level of vibration reaches a predetermined value, then the signal transmission module 154 will transmit related information to a user who has connected to the network and receive an instruction transmitted from a network end, so as to carry out a corresponding control or operation.

In addition, the microcontroller 15 further comprises a status detection module 155 for detecting voltage information, current information, or temperature information between the first circuit connection terminal 111 and the second circuit connection terminal 112, and the status detection module 155 is coupled to the signal transmission module 154 via a signal for transmitting data through the PLC network, so that a user at a remote end can understand and control the status by a computer or a smart phone.

Figure 3:
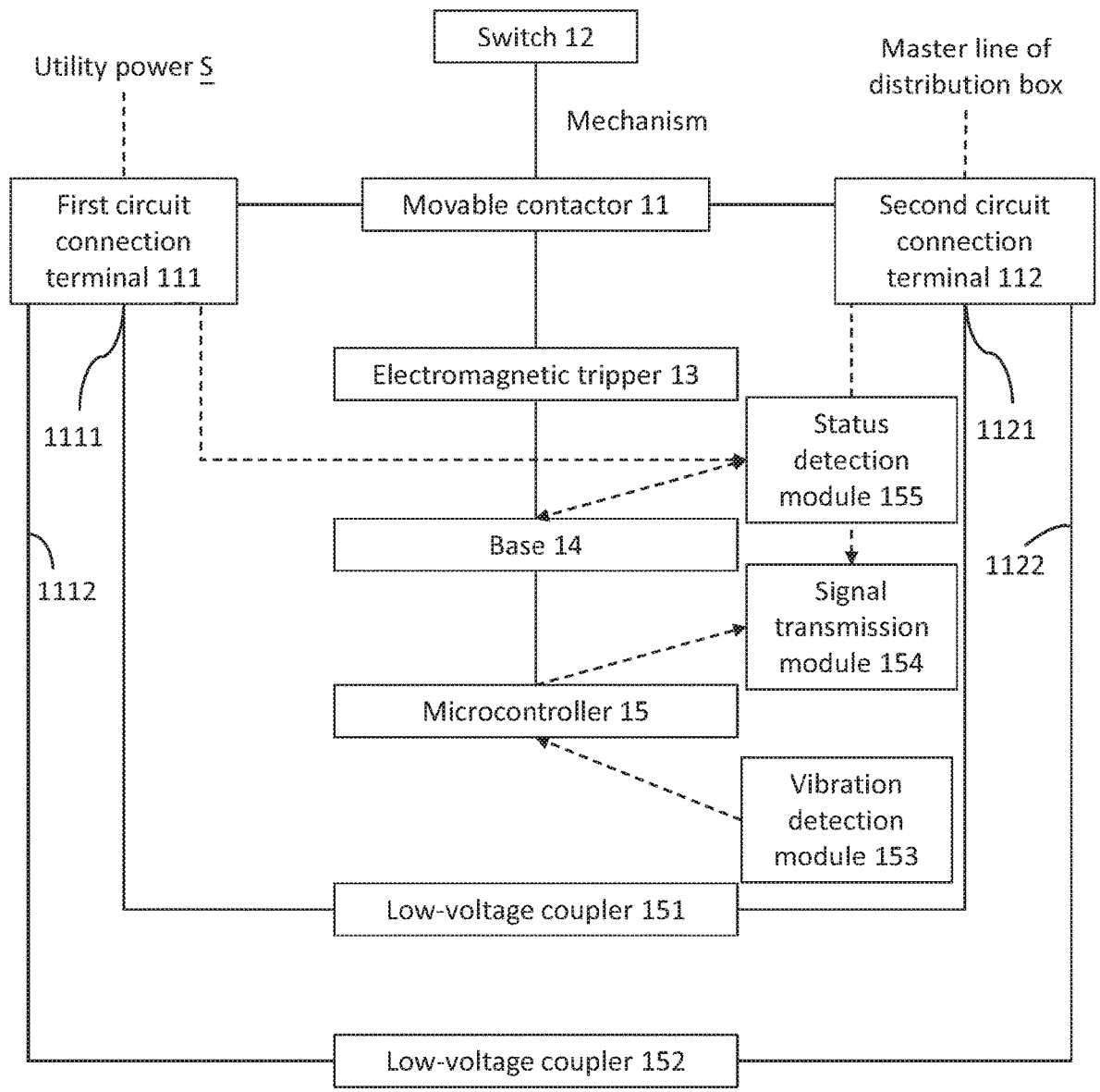
FIG. 3 is a schematic block diagram of a fuseless switch in accordance with a third embodiment of the present invention.

With reference to FIG. 3 for a schematic block diagram of a fuseless switch in accordance with another embodiment of the present invention, the low-voltage coupler 151 is a six-wire coupler (having six wires in one coupler) for connecting six circuits. In FIG. 3, the first circuit connection terminal 111 and the second circuit connection terminal 112 are directly and electrically coupled to achieve the effect of transmitting data through the PLC network.

The form of the low-voltage coupler of the present invention includes the form with the same or similar effect by using a microprocessor. In other words, they are equivalent components.

While the invention has been described by means of specific embodiments, numerous modifications and variations could be made thereto by those skilled in the art without departing from the scope and spirit of the invention set forth in the claims.

What is claimed is:

1. A fuseless switch for a cross phase of a power line communication network, comprising:
   a movable contactor, linearly coupled between a first circuit connection terminal and a second circuit connection terminal, wherein the first circuit connection terminal is coupled to utility power and the second connection terminal is coupled to a main line of a distribution box;
   a switch, coupled to the movable contactor through a mechanism, and an electromagnetic tripper being coupled to the movable contactor, and capable of driving the movable contactor to move, so as to disconnect the first circuit connection terminal from the second circuit connection terminal;
   a base, electrically coupled to the electromagnetic tripper;
   a microcontroller, electrically coupled to the base; and
   a low-voltage coupler, electrically coupled to a first ground line of the first circuit connection terminal and a second ground line of the second circuit connection terminal.

2. The fuseless switch for a cross phase of a power line communication network as claimed in claim 1, wherein the low-voltage coupler is further electrically coupled to a first neutral line of the first circuit connection terminal and a second neutral line of the second circuit connection terminal, wherein a network signal is connected to other circuits and applied to a single-phase two-wire mode in response to coupling the first neutral line and the second neutral line with the low voltage coupler.

3. The fuseless switch for a cross phase of a power line communication network as claimed in claim 2, wherein the microcontroller is further coupled to a vibration detection module and a signal transmission module via signals; the vibration detection module is provided for detecting whether or not a vibration occurs, and the signal transmission module is provided for transmitting information or receiving an instruction.

4. The fuseless switch for a cross phase of a power line communication network as claimed in claim 3, wherein the microcontroller further comprises a status detection module for detecting voltage information, current information, or temperature information between the first circuit connection terminal and the second circuit connection terminal, and the status detection module is coupled to the signal transmission module via signals.

5. The fuseless switch for a cross phase of a power line communication network as claimed in claim 4, wherein the coupler is an inductive low-voltage coupler or capacitive low-voltage coupler.

* * * * *